United States Patent [19]
Oestreich

[11] 3,912,241
[45] Oct. 14, 1975

[54] PRESS EXTRUDER FOR PROCESSING THERMOPLASTIC MATERIALS
[75] Inventor: Ulrich Oestreich, Berlin, Germany
[73] Assignee: Siemens Aktiengesellschaft, Munich, Germany
[22] Filed: Sept. 5, 1974
[21] Appl. No.: 503,437

[30] Foreign Application Priority Data
Sept. 10, 1973  Germany............................ 2346032

[52] U.S. Cl............................ 259/191; 259/DIG. 13
[51] Int. Cl.² ........................................... B29B 1/10
[58] Field of Search ......... 259/9, 10, 191, 192, 193, 259/DIG. 13; 425/208, 204

[56] References Cited
UNITED STATES PATENTS
2,910,726  11/1959  Parshall .......................... 425/208 X
3,850,415  11/1974  Hansen ............................... 259/191

Primary Examiner—Peter Feldman
Assistant Examiner—Alan Cantor
Attorney, Agent, or Firm—Kenyon & Kenyon Reilly Carr & Chapin

[57] ABSTRACT

An improved single-screw press having a single flight for use in extrusion of thermoplastic from raw granular or powdered material in which improved feeding of the material to be processed is accomplished by forming the screw, in the vicinity of the feed throat and feed section of the screw, with at least three flights the exact number of flights being proportional or approximately proportional to the diameter of the screw.

5 Claims, 1 Drawing Figure

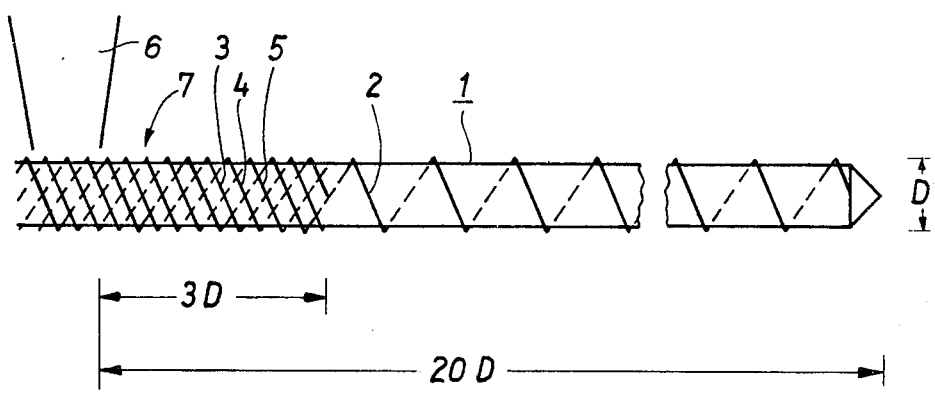

PRESS EXTRUDER FOR PROCESSING THERMOPLASTIC MATERIALS

This invention relates to the extrusion of thermoplastics from raw granular or powdered materials in general, and more particularly to an improved screw press for carrying out such extrusion.

Single screw constant diameter extruders or presses are presently widely used for the extrusion of thermoplastics from raw granular or powdered material. The manner in which such single screw extruders operate is well known to those skilled in the art and is disclosed in an article entitled "Extrusion" by Donald C. Craft, in the Modern Plastic Encyclopedia, vol. 50, No. 10A, p. 334. Another article of the same name by R. T. Vanness, G. R. Dehoff and R. M. Boner, is contained in the "Modern Plastics Encyclopedia" vol. 48, No. 10A, pg. 350, also describes such extruders.

In such extrusion processing of thermoplastic material such as polyethylene and polyvinylchloride using screw presses or extruders it has recently become possible to increase performance and uniformity of discharge by a considerable amount. One manner in which this has been achieved is by providing the smooth cylinder or barrel of the single screw extruder with longitudinal grooves cooled by a water cooling system in the feeding region. In this manner, the transport characteristics of the screw press particularly in the feeding region are improved. Otherwise, transport characteristics depend heavily on the friction coefficient of the material being processed and the input pressure. Improvements of this nature have been achieved particularly with screw presses having small screw diameters, i.e., screw presses having a screw diameter of up to 60 mm, using highly flowable solids. Such is disclosed in the Journal "Industrie Anzeiger" vol. 95, No. 25, Mar., 1973, pgs. 485 to 489.

The use of this known extrusion process employing a cylinder which is slotted lengthwise in the vicinity of the feed throat and the feed section has been successful only to a limited degree in larger screw presses, i.e., in low speed ranges or where particularly high flowable materials have been used. The problem which arises when trying to operate with larger screw presses is that in order to implement the conveyer principle operating on the basis of a lengthwise slotted cylinder, the depth of the threads (known in the art as "flights," which term will be used herein) of the screw in the feeding region must not be too great. This depth, known in the art as the "flight depth," must be considerably smaller than in conventional screw presses. As a consequence, the "compression" which normally has a value of between 3 and 4, then drops down to 2. On the other hand, the advance of the material to be processed from the hopper into the first flight becomes more difficult the shallower the flight is cut. Since the depth of the flight of the screw can be only increased a small amount with increasing screw diameter where the slot conveyer principle is used, reliable filling of the first turn of the screw behind the hopper becomes more and more difficult with increasing screw diameter. On the other hand, if the first flight is not completely filled with material being extruded, the slot conveyer principle will not become effective because the spline action is lacking. As a result, at higher screw speeds, the slot conveyer principle breaks down because of the shorter time available for the material being processed to flow into the first flight of the screw.

Screw processes have been used in the prior art in which the basically single flight screw in the single screw press is made with two flights in the feeding region, i.e., in the vicinity of the feed throat of the hopper and the feed section of the screw. The conveyer output of screw presses can be improved by this measure which is intended for screws with different screw diameter.

In view of these problems of applying this principle to screws of larger diameter, it is the object of the present invention to increase the expulsion rate in larger sizes of single screw press, i.e., in screw presses having a screw diameter of 60 mm or more, used in the extrusion of thermoplastic materials.

SUMMARY OF THE INVENTION

The present invention starts out to solve this problem with a single screw press having a slotted cooled cylinder in the feeding region and having a single flight screw made with several flights in the region of the feed throat of the hopper and the feed section of the screw. According to the present invention, in this region, the screw is made at least as a triple flight screw with the integral number of screw flights, $n$, proportional or approximately proportional to the screw diameter D, according to the relation: $n \approx D(mm)/25$.

BRIEF DESCRIPTION OF THE DRAWINGS

The single FIGURE is a schematic illustration of a screw according to the present invention.

DETAILED DESCRIPTION OF THE PREFERRED EMBODIMENT

In a screw press design according to the present invention the number of helix flights provided in the feed section of the screw depend on the screw diameter. Through the provision of these extra flights the expulsion output is improved even in screws with large screw diameters. Screw presses having a screw diameter of in the range of from 60 to 90 mm are therefor designed with three flights in the feed section according to the above equation $n \approx D(mm)/25$. Similarly, screw presses having a screw diameter of 85 to 110 mm have four flights in the feed section and those having a screw diameter of 100 to 170 mm, five to six flights in the feed section. In each case, the number of flights required is determined by dividing the screw diameter in milimeters by the constant "25" and rounding off to the nearest integral value.

In order to obtain optimum expulsion output within the scope of the present invention, it is further advisable that the volume of the main flight of the screw present per lead, i.e., between main flights in the feed section and that of the remaining region of the screw be equal or approximately equal. This means that the flight thickness and/or the flight depth of the screw in the feed section must be maintained so that no decompression of the material being extruded occurs at the point of transition from the multi-flight portion to the single flight portion of the screw. This transition advantageously occurs at between 5 and 30% of the active screw length and more preferably at 10 to 20% and even more preferably at 10 to 15% of the active screw length. Active screw length herein refers to the length of the screw from the edge of the feed throat to the tip of the screw.

The multi-flight design of the basically single-flight screw in the feed section is based on the discovery that forced transfer of a screw flight beginning at the cylinder or barrel entrance, i.e., at the end of the feed throat, leads to a front of solid material extending up to the next flight following in a transport direction due to the engagement of the solid material being processed with the cooled longitudinal cylinder slots. A second front of solid material is set up by the axial advance of the solid from the edge of the feed throat in the region behind a conveying screw flight. Behind the screw flight next to the edge of the hopper, a region which is not fully charged then occurs. If this region becomes too large in larger screws or at higher speeds, this leads to a change of the conveyer characteristic manifesting itself in a bend or break of the conveyer characteristic which basically is a straight line. However, if the number of flights of the screw is increased proportional to the screw diameter in the feed region as in the present invention, the region which is not fully charged either becomes smaller because of the decreased distance between screw flights or is entirely eliminated. As a result, instabilities in the conveyer characteristic of the screw press are prevented.

The screw of the present invention for obtaining such improved operation is illustrated on the FIGURE. The screw 1 whose active length is 20 times the screw diameter D is basically a single-flight screw. In addition to the main screw flight 2 however, there are provided three screw flights 3, 4 and 5 uniformerly distributed in the main thread of the screw extending in the region of the feed throat 6 and the feed section 7. The additional flights extend over approximately 15% of the active length of the screw. That is, they extend over a length three times the screw diameter measured from the edge of the feed throat in the transport direction. These flights are cut deeper in the multi-thread portion of the screw than in the single thread portion so that no decompression occurs at the transition point from the multi-flight portion to the single flight portion when the thermoplastic material is transported.

Thus, an improved single screw press for extruding thermoplastics has been shown. Although a specific embodiment has been illustrated and described, it will be obvious to those skilled in the art that various modifications may be made without departing from the spirit of the invention which is intended to be limited solely by the appended claims.

I claim:

1. An improved screw for a single-screw press having a slotted cooled cylinder in the feed section for processing thermo-plastic materials in powder or granular form, comprising a screw having at least three flights in the feed section with the number of flights approximately proportional to the screw diameter divided by the constant 25.

2. A screw according to claim 1 wherein the volume available between screw flights in the multi-thread portion of the feed section and the remaining region of a single thread are approximately equal to each other.

3. A screw according to claim 1 wherein said at least three flights in the feed section are disposed in a uniformly distributed manner with respect to the main flight of the screw.

4. A screw press according to claim 1 wherein said feed section containing multiple screw flights extends over 5 to 30% of the active length of the screw.

5. A screw according to claim 4 wherein said feed section extends over 10 to 20% of the active length.

* * * * *